United States Patent
Murray et al.

(10) Patent No.: US 10,094,985 B2
(45) Date of Patent: Oct. 9, 2018

(54) CLEANING PADS FOR FIBER OPTIC CONNECTORS

(71) Applicant: CommScope Connectivity UK Limited, Dorcan, Swindon (GB)

(72) Inventors: David Patrick Murray, Bristol (GB); Karthik Kumar, Karnataka (IN)

(73) Assignee: CommScope Connectivity UK Limited (GB)

( * ) Notice: Subject to any disclaimer, the term of this patent is extended or adjusted under 35 U.S.C. 154(b) by 88 days.

(21) Appl. No.: 15/024,275

(22) PCT Filed: Sep. 22, 2014

(86) PCT No.: PCT/EP2014/070081
§ 371 (c)(1),
(2) Date: Mar. 26, 2016

(87) PCT Pub. No.: WO2015/040201
PCT Pub. Date: Mar. 26, 2015

(65) Prior Publication Data
US 2016/0246013 A1   Aug. 25, 2016

Related U.S. Application Data

(60) Provisional application No. 61/881,282, filed on Sep. 23, 2013.

(51) Int. Cl.
*B08B 3/00* (2006.01)
*G02B 6/38* (2006.01)
*B08B 1/00* (2006.01)

(52) U.S. Cl.
CPC ............ *G02B 6/3866* (2013.01); *B08B 1/006* (2013.01)

(58) Field of Classification Search
None
See application file for complete search history.

(56) References Cited

U.S. PATENT DOCUMENTS 9,753,229 B2    9/2017  Murray et al.
2006/0067635 A1  3/2006  Carberry et al.
2011/0303241 A1 12/2011  Tourigny

FOREIGN PATENT DOCUMENTS

EP         1 048 963       11/2000
WO      WO 2010/093407     8/2010

OTHER PUBLICATIONS

International Search Report and Written Opinion for International Application No. PCT/EP2014/070081 dated Nov. 27, 2014 (13 pages).

*Primary Examiner* — Eric W Golightly
(74) *Attorney, Agent, or Firm* — Merchant & Gould P.C.

(57) ABSTRACT

A cleaning pad for cleaning fiber optic connectors includes: a main body; and cleaning locations located along the main body, each of the cleaning locations having a space in which a fiber optic connector is to be cleaned.

5 Claims, 10 Drawing Sheets

CLEANING PADS FOR FIBER OPTIC CONNECTORS

CROSS-REFERENCE TO RELATED APPLICATION(S)

This application is a National Stage of PCT/EP2014/070081, filed 22 Sep. 2014, which claims benefit of U.S. Patent Application Ser. No. 61/881,282 filed on Sep. 23, 2013 and which applications are incorporated herein by reference. To the extent appropriate, a claim of priority is made to each of the above disclosed applications.

BACKGROUND

Fiber optic connectors are used to terminate the ends of fiber optic cables. There are many different fiber optic connector types. Example types of fiber optic connectors include FC-type, SC-type, ST-type and D4-type.

A typical connector includes a ferrule located inside the connector. The ferrule is a relatively long, thin cylinder made of a material such as ceramic. Other materials such as metal or plastic can also be used to make the ferrule. The ferrule defines a central opening sized to receive a fiber of a given cladding diameter. An epoxy is typically placed into the opening prior to inserting the fiber to hold the fiber in place. The ferrule functions to align and center the fiber, as well as to protect it from damage.

It is desirable to minimize the loss of signals passing through the fiber. Parameters for evaluating the performance of a connector include insertion loss and return loss. Insertion loss is the measurement of the amount of power that is transferred through a coupling from an input fiber to an output fiber. Return loss is the measurement of the amount of power that is reflected back into the input fiber. It is desirable to enhance signal quality and therefore optimize insertion/return loss.

SUMMARY

In one aspect, a cleaning pad for cleaning fiber optic connectors includes: a main body; and a plurality of cleaning locations located along the main body, each of the cleaning locations defining a space in which a fiber optic connector is to be cleaned.

In another aspect, a cleaning system for cleaning fiber optic connectors includes: a cleaning pad including: a main body; and a plurality of cleaning locations located along the main body, each of the cleaning locations defining a space in which a fiber optic connector is to be cleaned; and a cleaning tissue positioned over the cleaning pad.

In yet another aspect, a method for cleaning a plurality of fiber optic connectors includes: providing a cleaning pad including a main body and a plurality of cleaning locations located along the main body; positioning a cleaning tissue over the cleaning pad; and placing a fiber of a fiber optic connector in one of the cleaning locations to contact the cleaning tissue to clean the fiber.

DETAILED DESCRIPTION

The present disclosure relates to systems and methods for cleaning fiber optic connectors. In the examples provided, a cleaning pad includes a plurality of cleaning locations. The cleaning locations are configured to allow for ease in the cleaning of the fibers of the connectors.

FIGS. 1-7 show an example cleaning system 100. The cleaning system 100 includes a plurality of cleaning locations 104 positioned along a cleaning pad 102.

Figure 1:
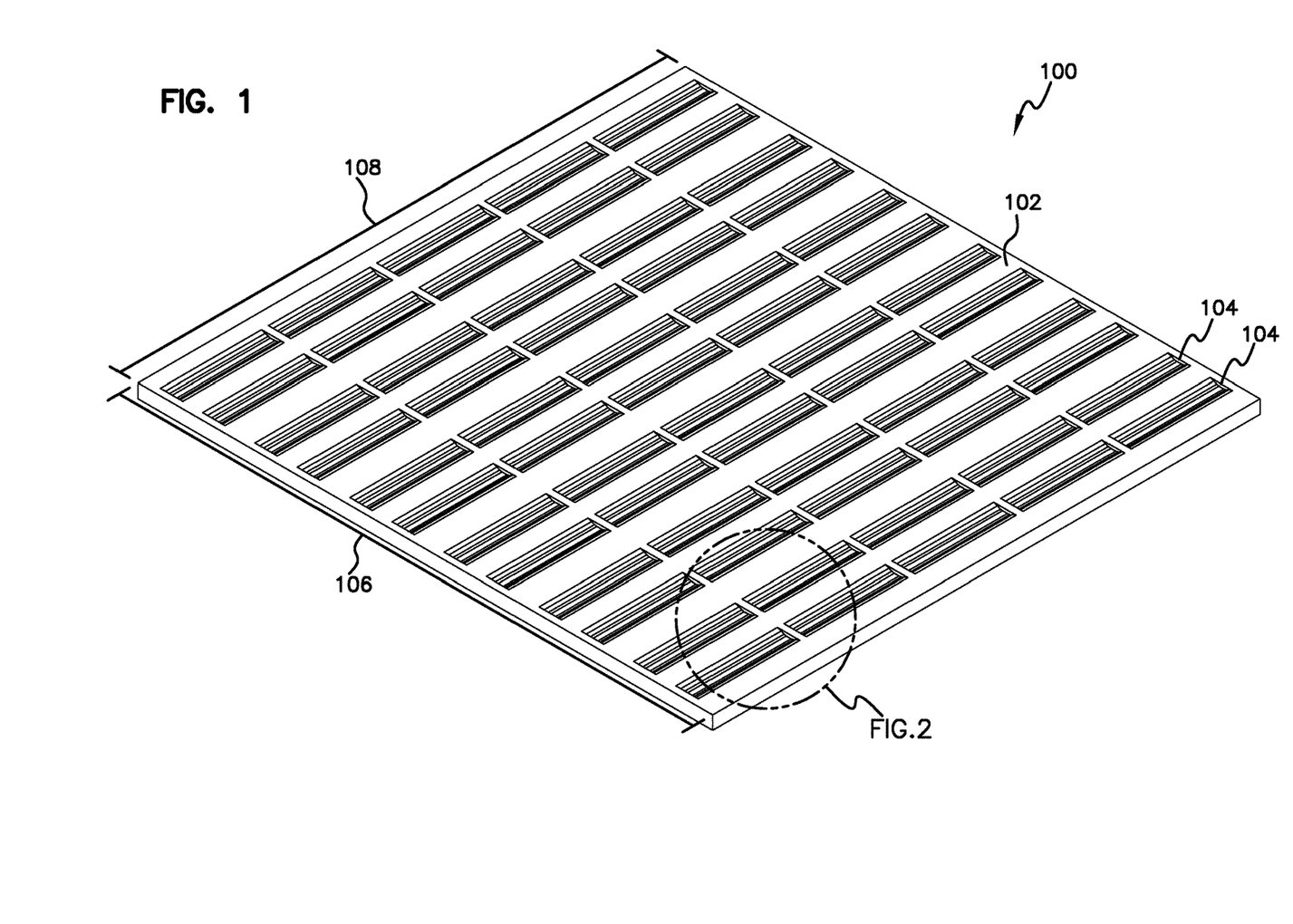
FIG. 1 shows an example fiber optic cleaning system including an example cleaning pad.
Figure 2:
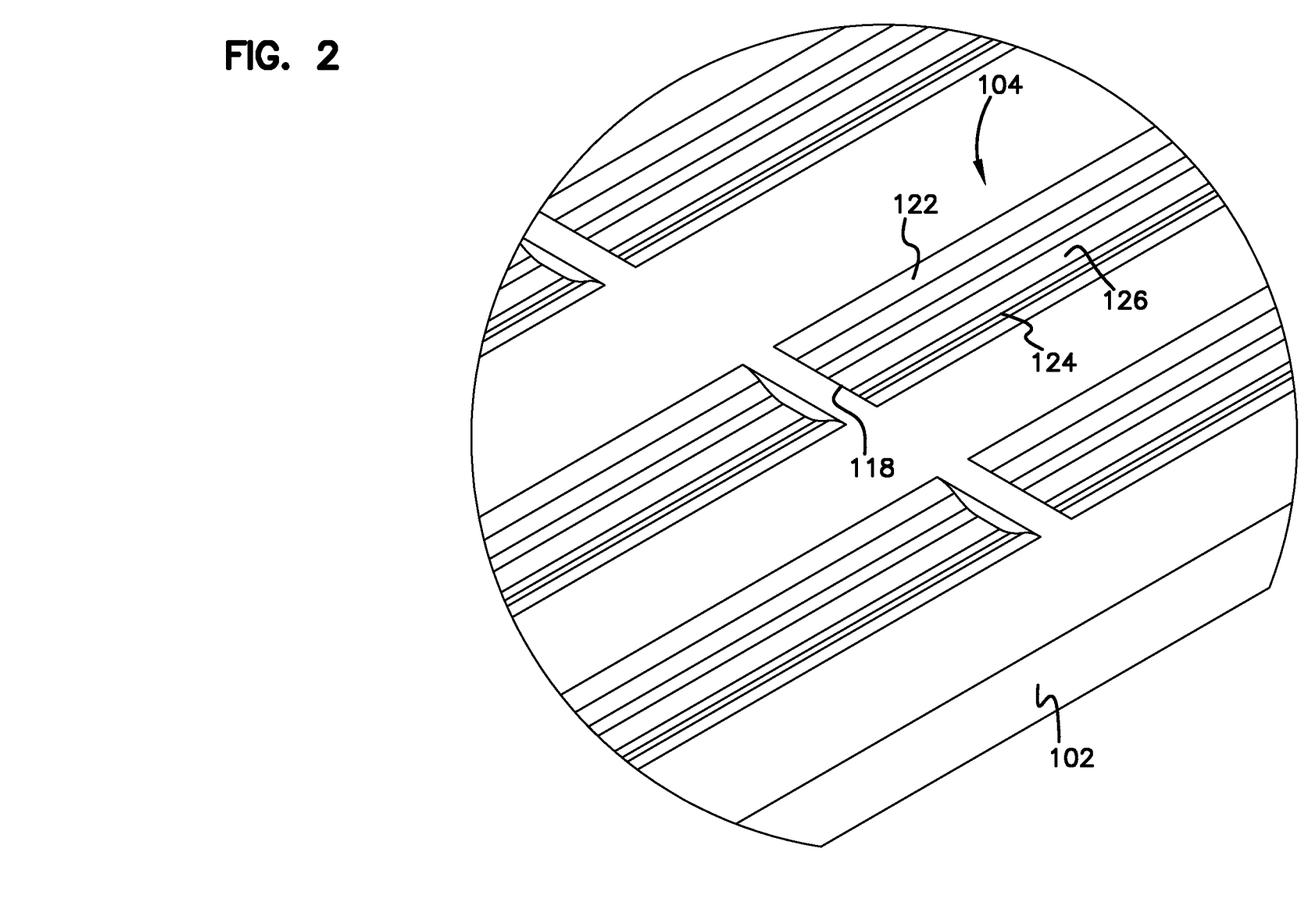
FIG. 2 shows an enlarged view of a portion of the cleaning pad of FIG. 1.
Figure 3:
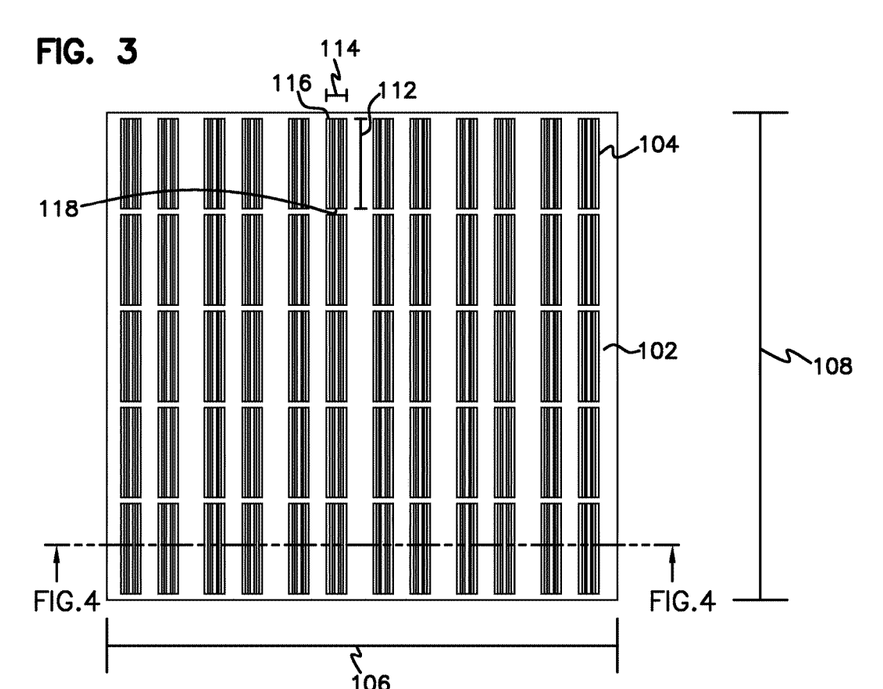
FIG. 3 shows a top view of the cleaning pad of FIG. 1.
Figure 4:
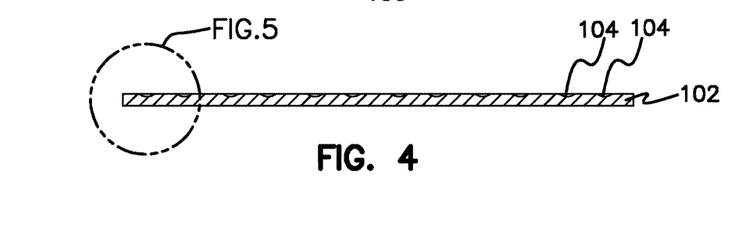
FIG. 4 shows a cross-sectional view of the cleaning pad of FIG. 3.

In the example shown, the cleaning pad 102 has a length 106 and a width 108 that generally form a square configuration. The cleaning locations 104 are located in rows along the cleaning pad 102.

While sixty cleaning locations 104 are shown, more or fewer (see, e.g., FIGS. 8-14) can be provided. In other configurations, the cleaning pad 102 can be configured in different shapes and sizes, and the cleaning locations 104 can be positioned on the pad in different configurations. The spacing between adjacent cleaning locations 104 can also be varied, as described further below.

As shown in FIGS. 2-5, each of the cleaning locations 104 has a length 112 extending from a first end 116 to a second end 118. The cleaning locations 104 also have a width 114. Each of the cleaning locations 104 has sloped sidewalls 122, 124 and a bottom wall 126. As described further below, the size and shape of the cleaning location 104 is configured to optimize the cleaning of a connector.

Figure 5:
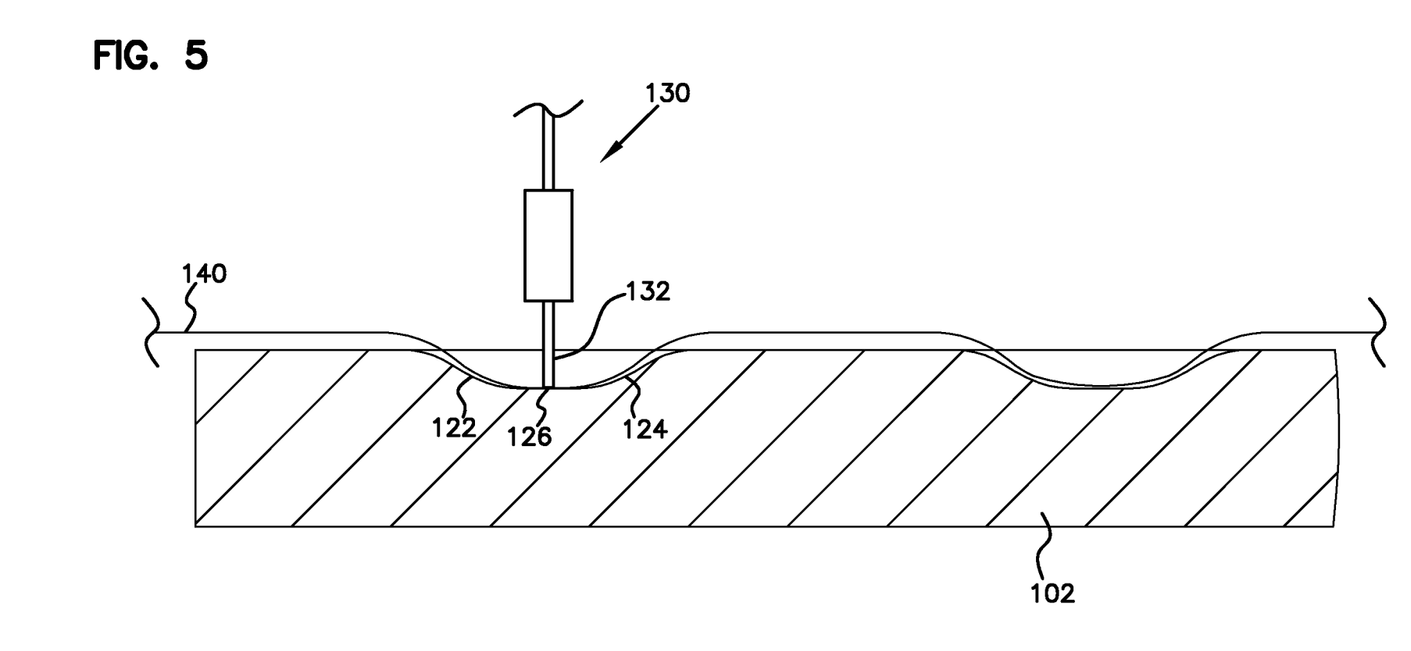
FIG. 5 shows an enlarged view of a portion of the cleaning pad of FIG. 4 including a cleaning tissue positioned thereon and a fiber optic connector being cleaned.
Figure 6:
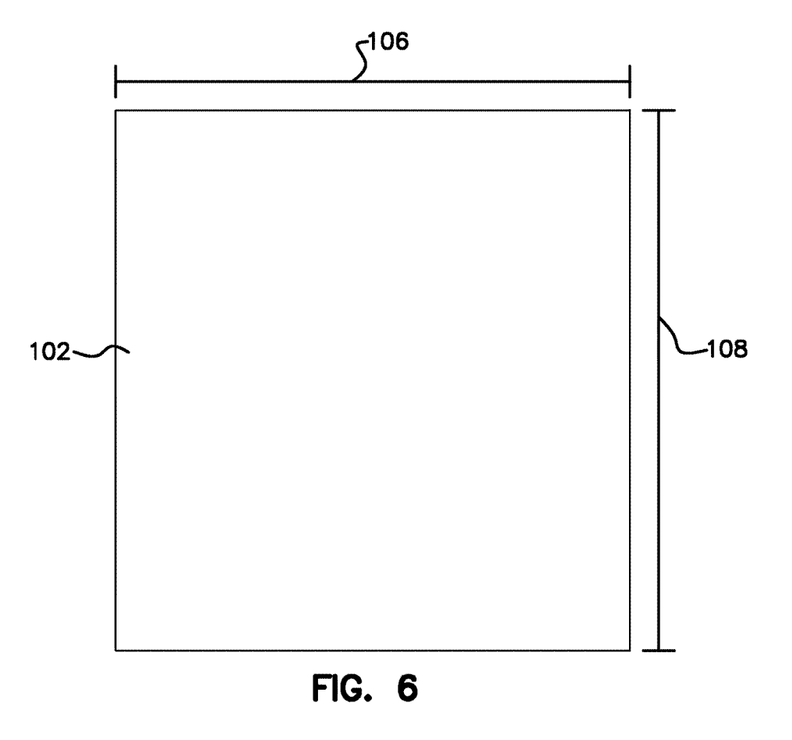
FIG. 6 shows a bottom view of the cleaning pad of FIG. 1.
Figure 7:
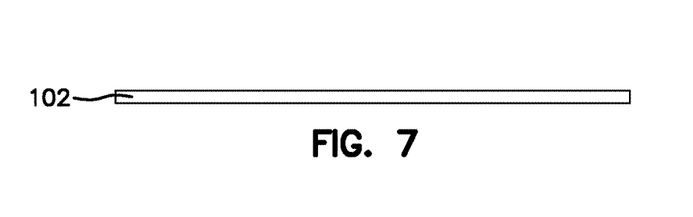
FIG. 7 shows a side view of the cleaning pad of FIG. 1.

Referring now to FIG. 5, the cleaning pad 102 is shown in use. To use, a cleaning tissue 140 is positioned over the cleaning pad 102 to cover the cleaning locations 104. In this configuration, a connector 130 is positioned so that a ferrule 132 is located within one of the cleaning locations 104. This is typically done by hand, with a technician holding the connector 130, either directly or through a fixture (see FIG. 11 below).

Once in position within the cleaning location 104, the ferrule 132 is moved along the length 112 of the cleaning location 104 from adjacent the first end 116 to adjacent the second end 118. This causes the fiber positioned in the ferrule 132 to be moved along the cleaning tissue 140. Debris such as dust and other undesirable material can be removed by the cleaning tissue 140. Once complete, the connector 130 is lifted to remove it from the cleaning location 104.

The size and shape of the cleaning location 104 assist in the cleaning of the connector 130. Specifically, the sloped sidewalls 122, 124 of the cleaning location 104 help to locate the ferrule 132 within the cleaning location 104 and resist movement of the ferrule 132 out of the cleaning location 104 during cleaning. The bottom wall 126 provides a flat surface for the fiber to be brought into contact with the cleaning tissue 140.

The length 112 of the cleaning location 104 provides an indication to the technician of the proper amount of cleaning material that can be used to clean the connector 130. In other words, by starting the connector 130 adjacent to the first end 116 and moving the connector 130 to adjacent the second end 118 along the length 112 of the cleaning location 104, a proper amount of the cleaning tissue is used.

In this example, the cleaning tissue 140 that is located in each of the cleaning locations 104 is used once. When sixty connectors have been cleaned, the cleaning tissue 140 is removed, and a new cleaning tissue is placed over the cleaning pad 102.

Referring now to FIGS. 8-14, another example cleaning system 200 is shown. The cleaning system 200 is similar to system 100 described above. The system 200 includes a plurality of cleaning locations 204 positioned along a cleaning pad 202. Each of the cleaning locations 204 is configured in a manner similar to the cleaning locations 104.

Figure 8:
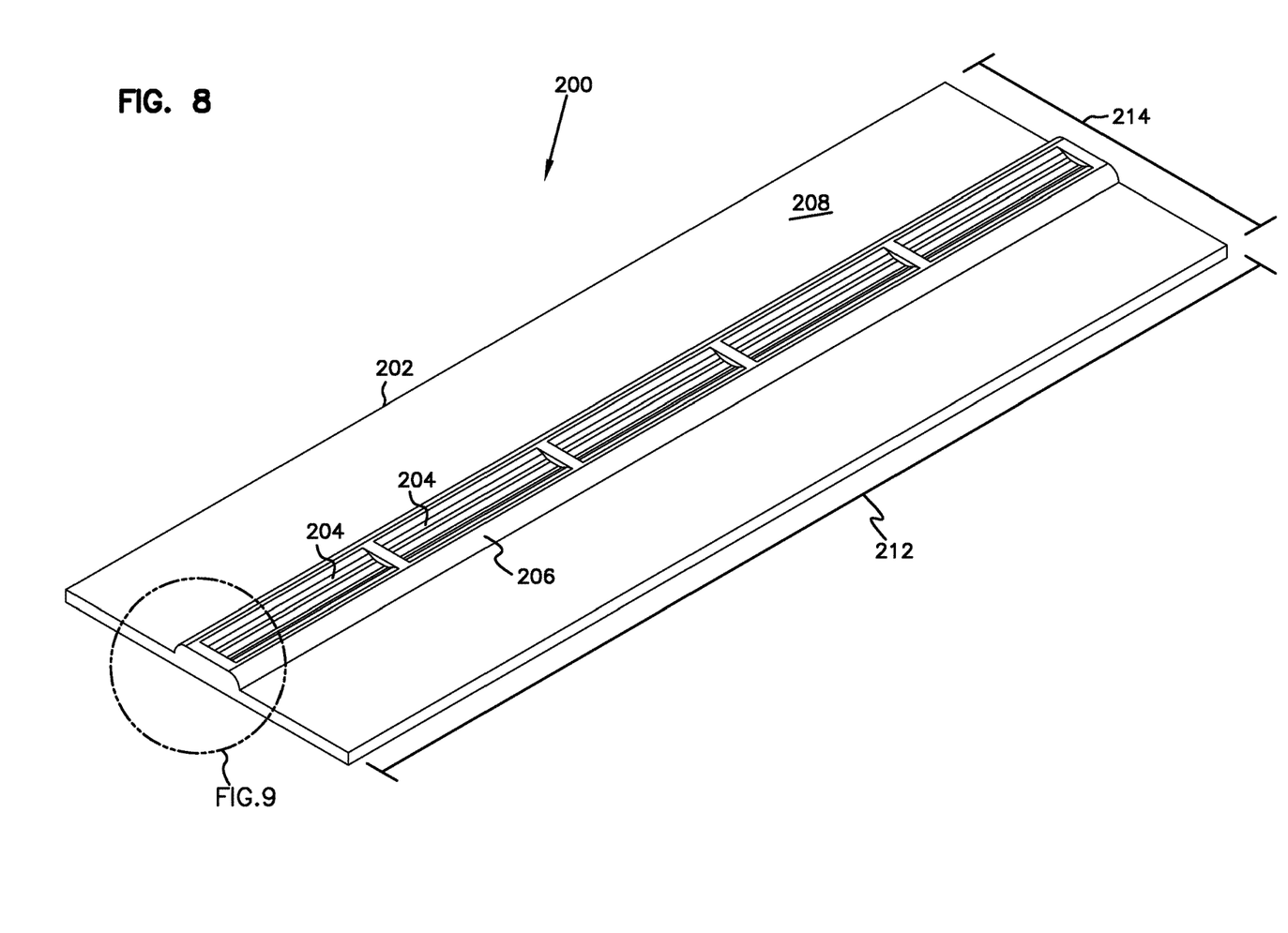
FIG. 8 shows another example fiber optic cleaning system including an example cleaning pad.
Figure 9:
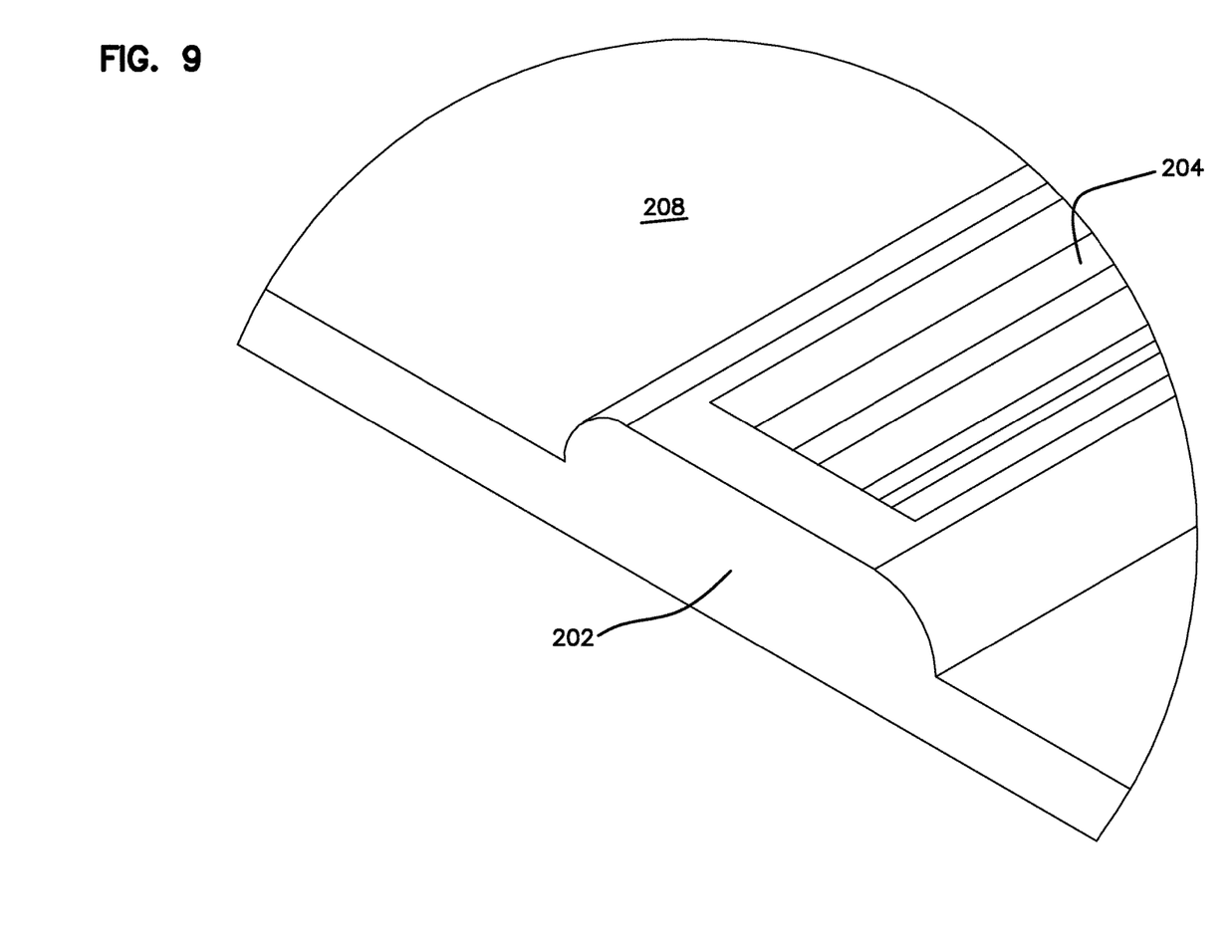
FIG. 9 shows an enlarged view of a portion of the cleaning pad of FIG. 8.
Figure 10:
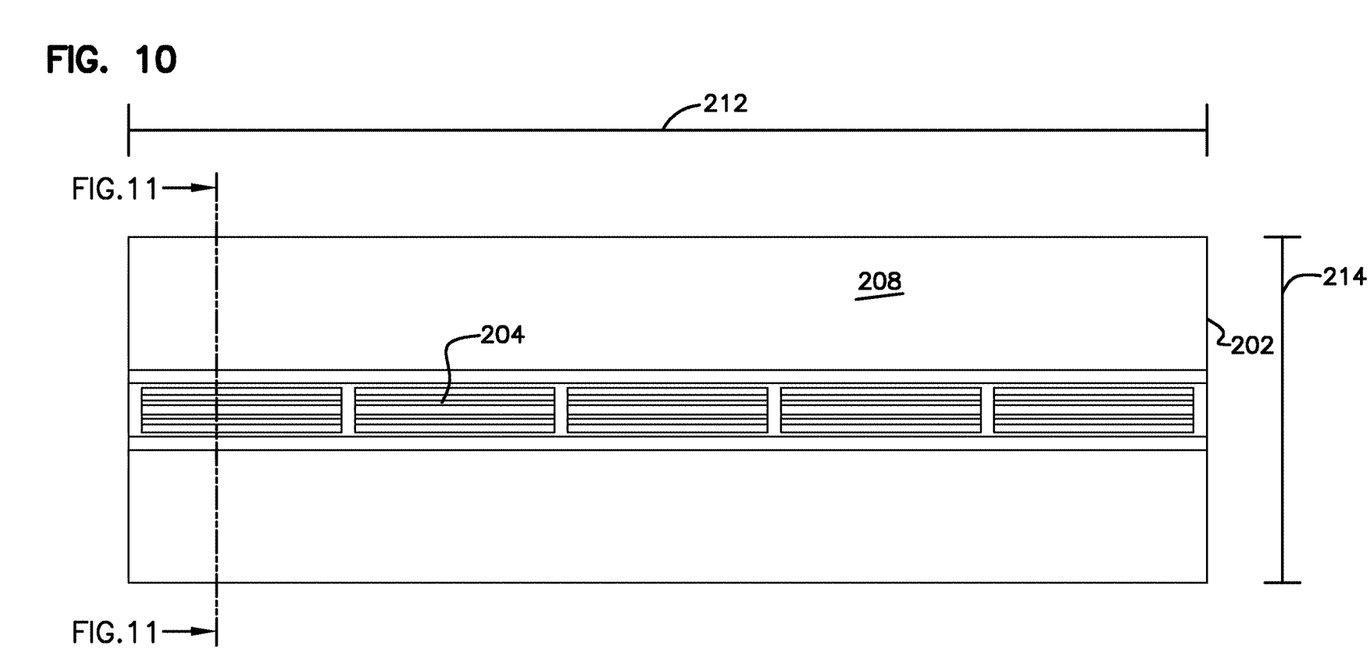
FIG. 10 shows a top view of the cleaning pad of FIG. 8.

In the example shown, the cleaning pad 202 has a length 212 and a width 214 that generally form a rectangular configuration. The cleaning locations 204 are located in a single row 206 extending along the length 212 of the cleaning pad 202.

Figure 11:
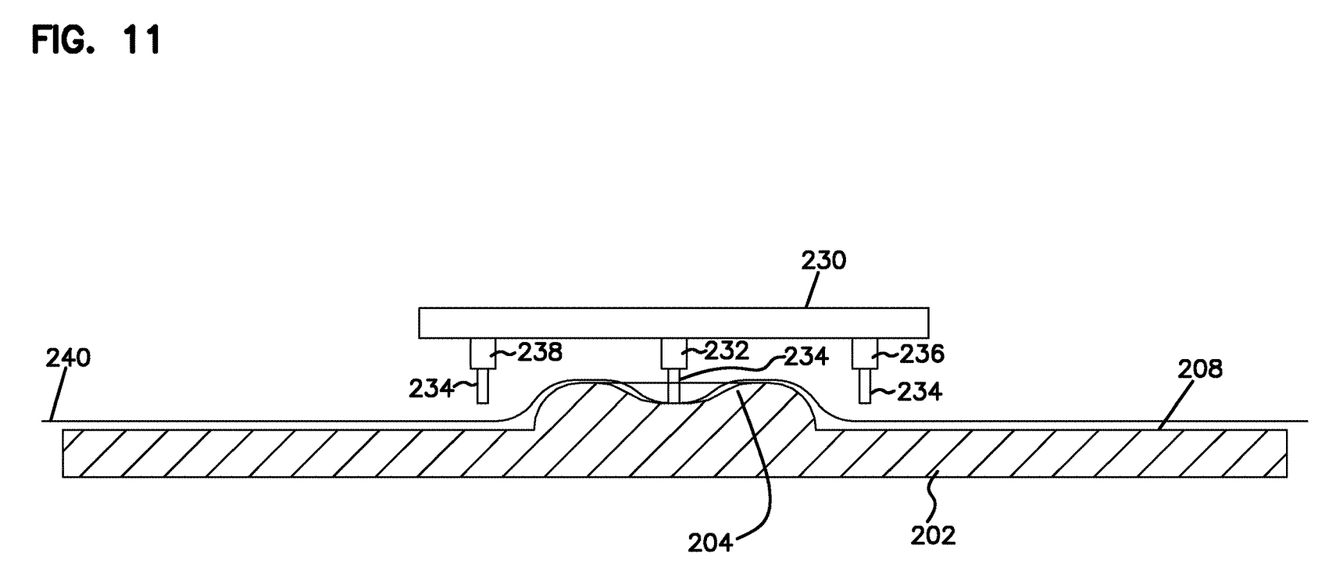
FIG. 11 shows a cross-sectional view of the cleaning pad of FIG. 10 including a cleaning tissue positioned thereon and a fiber optic connector positioned within a fixture being cleaned.
Figure 12:
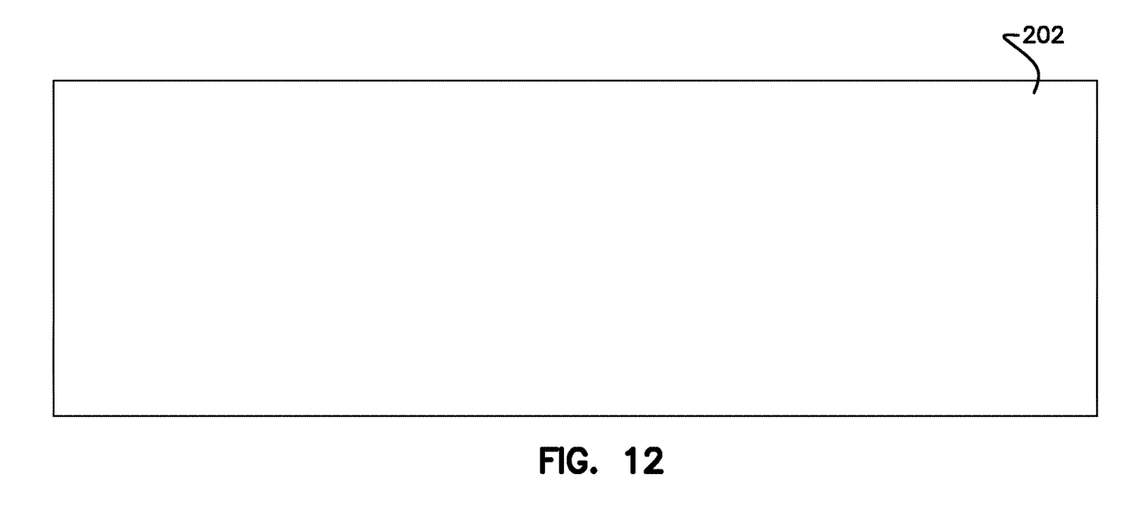
FIG. 12 shows a bottom view of the cleaning pad of FIG. 8.
Figure 13:
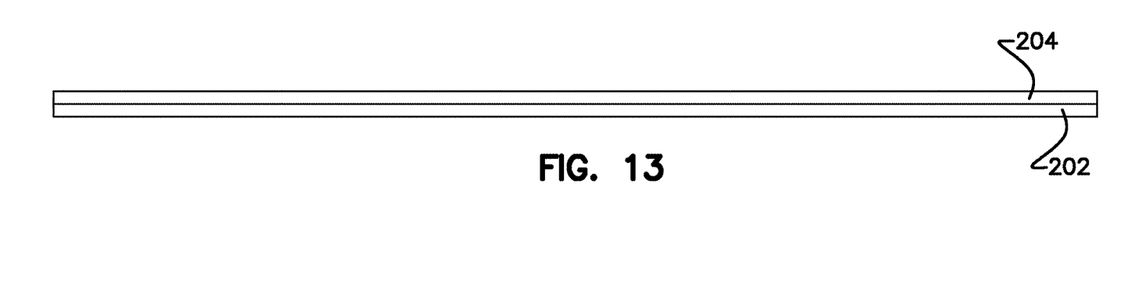
FIG. 13 shows a side view of the cleaning pad of FIG. 8.
Figure 14:
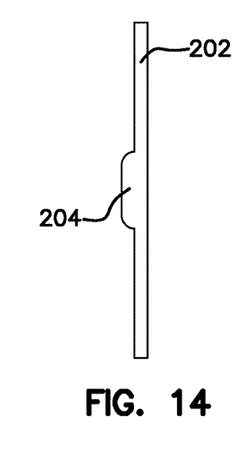
FIG. 14 shows an end view of the cleaning pad of FIG. 8.

Referring now to FIG. 11, a cleaning tissue 240 is positioned over the cleaning pad 202 to cover the cleaning locations 204. A fixture 230 holding a plurality of connectors 232, 236, 238 is positioned over one of the cleaning locations 204. In this configuration, the connector 232 is positioned so that a ferrule 234 of the connector 232 is located within one of the cleaning locations 104. This is typically done by hand, with the technician holding the fixture 230.

Once in position within the cleaning location 204, the ferrule 234 is moved along the length of the cleaning location 204. This causes the fiber positioned in the ferrule 234 of the connector 232 to be moved along the cleaning tissue 240. Debris such as dust and other undesirable material can be removed by the cleaning tissue 240.

Because only a single row 206 of cleaning locations 204 is provided, the other connectors 236, 238 in the fixture 230 are not cleaned during cleaning of the connector 232. In other words, a flat portion 208 on the cleaning pad 202 allows the connector 232 to be cleaned while keeping the other connectors 236, 238 in the fixture 230 from undesired contact with the cleaning pad 202. This allows a single connector (i.e., connector 232) within the fixture 230 to be cleaned without removing the connector from the fixture 230. Once complete, the fixture 230 is lifted to remove the connector 232 from the cleaning location 204.

Examples of such fixtures are provided in U.S. Patent Application Ser. No. 61/707,480 filed on Sep. 28, 2012, the entirety of which is hereby incorporated by reference. Other configurations are possible.

When all of the cleaning locations 204 in the row 206 have been used, the cleaning tissue 240 is indexed over so that a new portion of the cleaning tissue 240 is positioned over the cleaning locations 204. This is repeated until the entire cleaning tissue 240 is used. When this occurs, a new cleaning tissue 240 is used.

As noted, the size of the cleaning pads and the positions of the cleaning locations can be altered in other embodiments. For example, if a fixture is used, and it is desirable to clean multiple connectors located within the fixture at one time, the rows of the cleaning locations can be spaced to accommodate multiple connectors within the fixture.

In example embodiments, the cleaning pads are made of a polymeric material, such as rubber. Other materials can be used.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A cleaning system for cleaning fiber optic connectors, the cleaning system comprising:
    a cleaning pad including:
        a main body; and
        a plurality of cleaning locations located along the main body, each of the cleaning locations defining a space in which a fiber optic connector is to be cleaned, wherein each of the cleaning locations includes first and second sloped sidewalls and a bottom wall; and
    a cleaning tissue positioned over the cleaning pad.

2. The cleaning system of claim 1, wherein the cleaning locations are located in a plurality of rows along the cleaning pad.

3. The cleaning system of claim 1, wherein each of the cleaning locations extends along a length.

4. The cleaning system of claim 1, wherein the fiber optic connector to be cleaned is positioned in a fixture holding a plurality of fiber optic connectors.

5. The cleaning system of claim 1, wherein the cleaning tissue is replaced when all of the cleaning locations have been used.

* * * * *